United States Patent [19]

Goodzeit

[11] Patent Number: 5,092,543
[45] Date of Patent: Mar. 3, 1992

[54] SPACECRAFT ATTITUDE CONTROL WITH AVOIDANCE CONSTRAINT

[75] Inventor: Neil E. Goodzeit, East Windsor, N.J.

[73] Assignee: General Electric Company, East Windsor, N.J.

[21] Appl. No.: 413,136

[22] Filed: Sep. 27, 1989

[51] Int. Cl.$^5$ .......................... B64G 1/24; B64G 1/36
[52] U.S. Cl. .................................. 244/164; 244/171
[58] Field of Search ............... 244/164, 165, 166, 167, 244/168, 169, 170, 171, 172, 173; 250/203.6; 364/459, 455

[56] References Cited

U.S. PATENT DOCUMENTS

| | | | |
|---|---|---|---|
| 3,219,826 | 11/1965 | Letaw, Jr. ........................ | 250/203.6 |
| 3,427,453 | 2/1969 | Gill et al. ........................... | 244/171 |
| 3,490,719 | 1/1970 | Cantor et al. ...................... | 244/169 |
| 4,642,648 | 2/1987 | Hulland et al. .................... | 342/455 |
| 4,687,161 | 8/1987 | Plescia et al. ..................... | 244/164 |
| 4,997,146 | 3/1991 | Weyandt, Jr. ...................... | 244/171 |

OTHER PUBLICATIONS

Tuns NTR Evaluation Form-Detail Report; T22A dated May 2, 1990.

Primary Examiner—Joseph F. Peters, Jr.
Assistant Examiner—Anne E. Bidwell
Attorney, Agent, or Firm—William H. Meise

[57] ABSTRACT

The attitude of a space vehicle is controlled to direct an instrument in a particular direction. For certain maneuvers, the reorientation may temporarily result in an undesirable orientation of the spacecraft. For example, the instrument may be a telescope which, during slewing of the spacecaft from one direction in space to another, may pass through an attitude in which it is directed toward the Sun. A control system is provided which performs the attitude control with an avoidance constraint. The control system generates a first signal representative of the current and desired final orientations, and slews the attitude in response thereto. A second signal is also generated which represents the difference between the current orientation of a vector associated with the spacecraft and a vector in space which it is to avoid. A threshold signal is generated when the difference between the avoidance vectors is a particular value. When the threshold value is reached, the control system slews in response to a combination of the first and second signals.

5 Claims, 4 Drawing Sheets

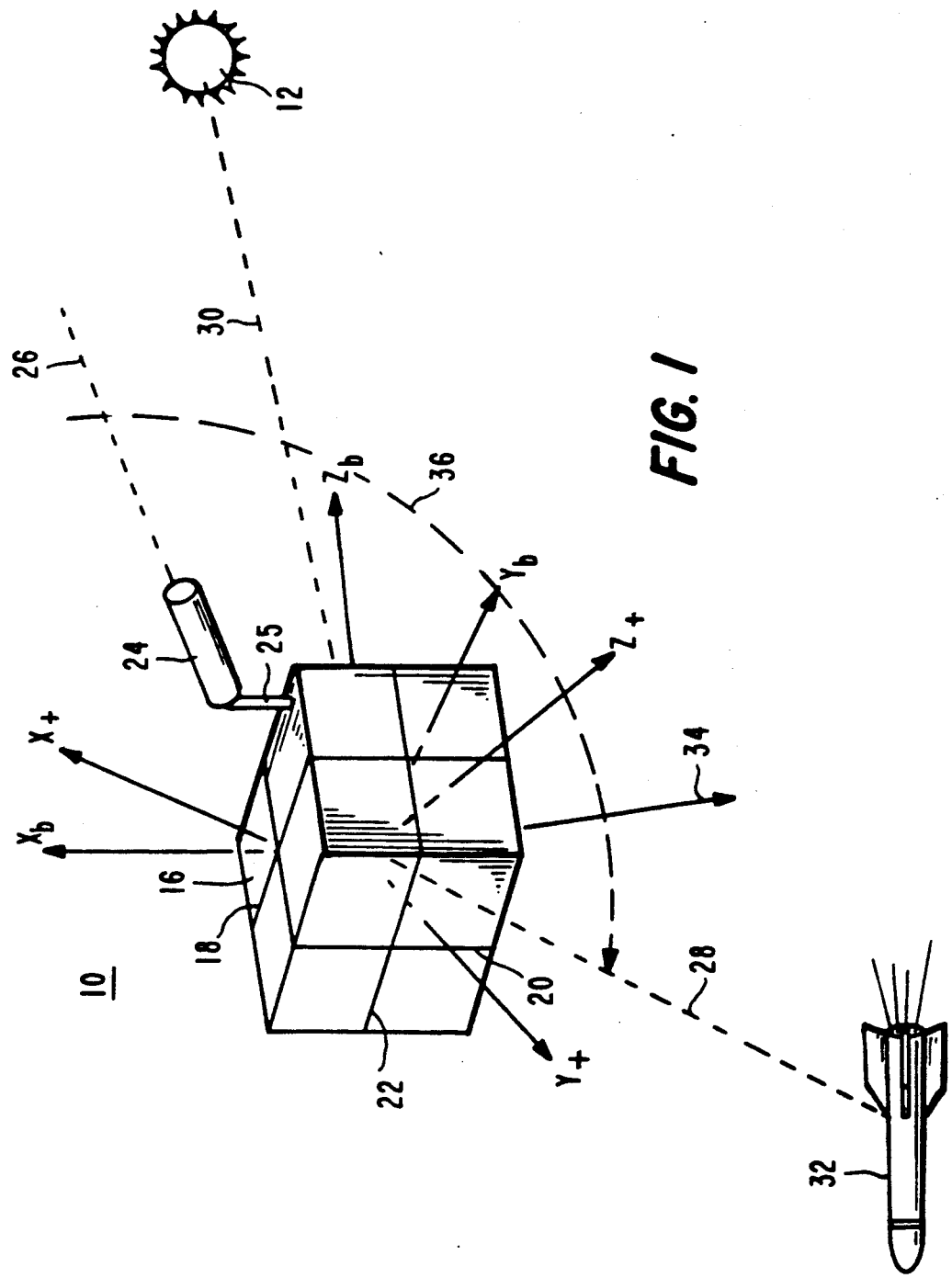

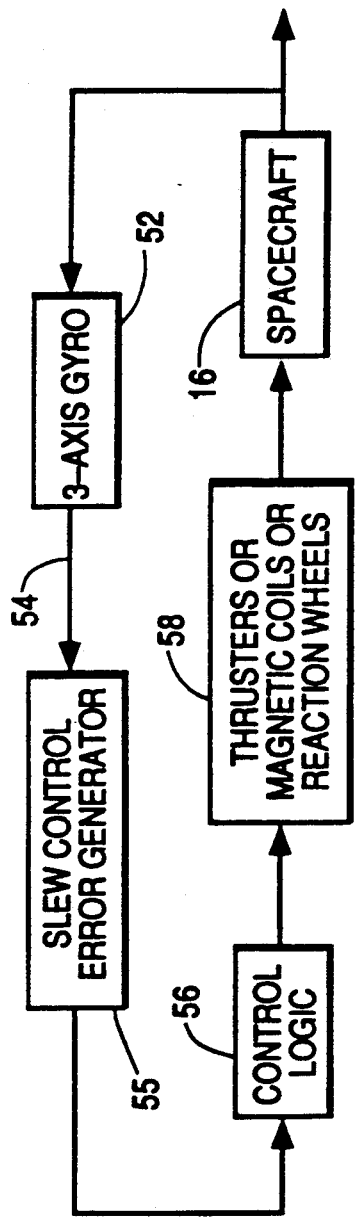
FIG. 3 PRIOR ART
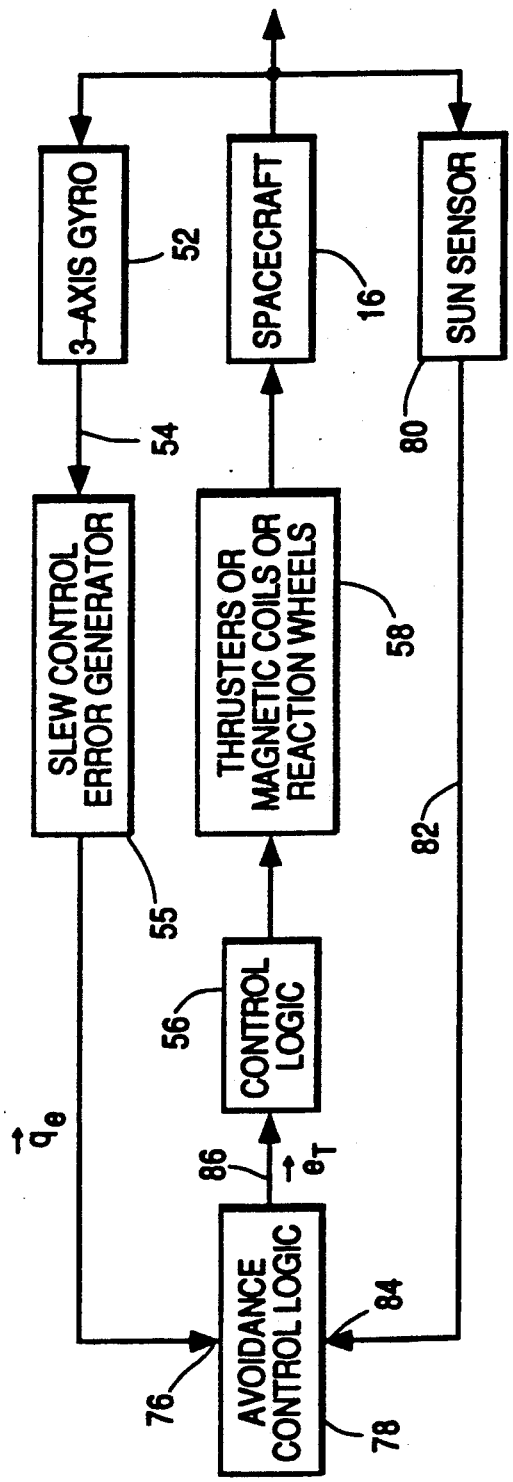
FIG. 4 SLEW ATTITUDE CONTROL SYSTEM WITH AVOIDANCE LOGIC

:092,543

SPACECRAFT ATTITUDE CONTROL WITH AVOIDANCE CONSTRAINT

The government has rights in this invention pursuant to subcontract JPL957444.

This invention relates to attitude control systems for satellites in which undesired attitudes are avoided during maneuvers.

Many spacecraft include instruments or devices which are to be directed toward particular objects in space. Such an instrument might be a telescope, camera, or the like, and the objects being examined by such instruments might be particular celestial objects, objects orbiting the Earth, or particular portions of the Earth itself.

When examination of one object has been completed, and examination of another, different object is desired, the spacecraft itself is often controlled in attitude so as to slew the instrument to the desired attitude in space. If the instrument is directed at a source of radiation which is harmful to the instrument, it may be damaged or become unusable.

SUMMARY OF THE INVENTION

A method and apparatus controls the attitude of a spacecraft from a first orientation to a second orientation relative to an environment by a path which avoids an undesired orientation. The method includes the step of establishing the current orientation of the spacecraft coordinate axes relative to its environment. A first error signal or slew error signal is generated which is representative of the difference between the current spacecraft orientation and the target orientation. An avoidance error signal is generated which represents at least the difference between the orientation of a first vector associated with the spacecraft coordinate axes and a second vector. A control arrangement reorients or slews the spacecraft to null a combination of the first and second error signals, tending to cause the spacecraft coordinate axes to rotate toward alignment with the target coordinate axes while avoiding the undesired attitude. In a particular embodiment of the invention, a comparison is made between the avoidance error signal and a threshold value, which threshold represents the closest desired approach of the first vector to the second vector. A threshold signal is generated in response to the comparison. The spacecraft is torqued in response to the first error signal when the threshold signal is in a first state to slew the spacecraft coordinate axes toward the target coordinate axes. The spacecraft is torqued in response to a combination of the first and avoidance error signals when the threshold signal is in a state other than the first state, to thereby cause the first vector to tend to avoid the second vector while the spacecraft coordinate axes slew toward the target coordinate axes.

DESCRIPTION OF THE DRAWING

FIG. 1 illustrates a satellite in space with an instrument mounted thereon, and also illustrates the Sun and a target in the form of a space vehicle;

FIG. 3 is a simplified block diagram of a prior art spacecraft attitude control system;

FIG. 4 is a simplified block diagram of a spacecraft attitude control system in accordance with the invention.

DESCRIPTION OF THE INVENTION

Figure 2A:
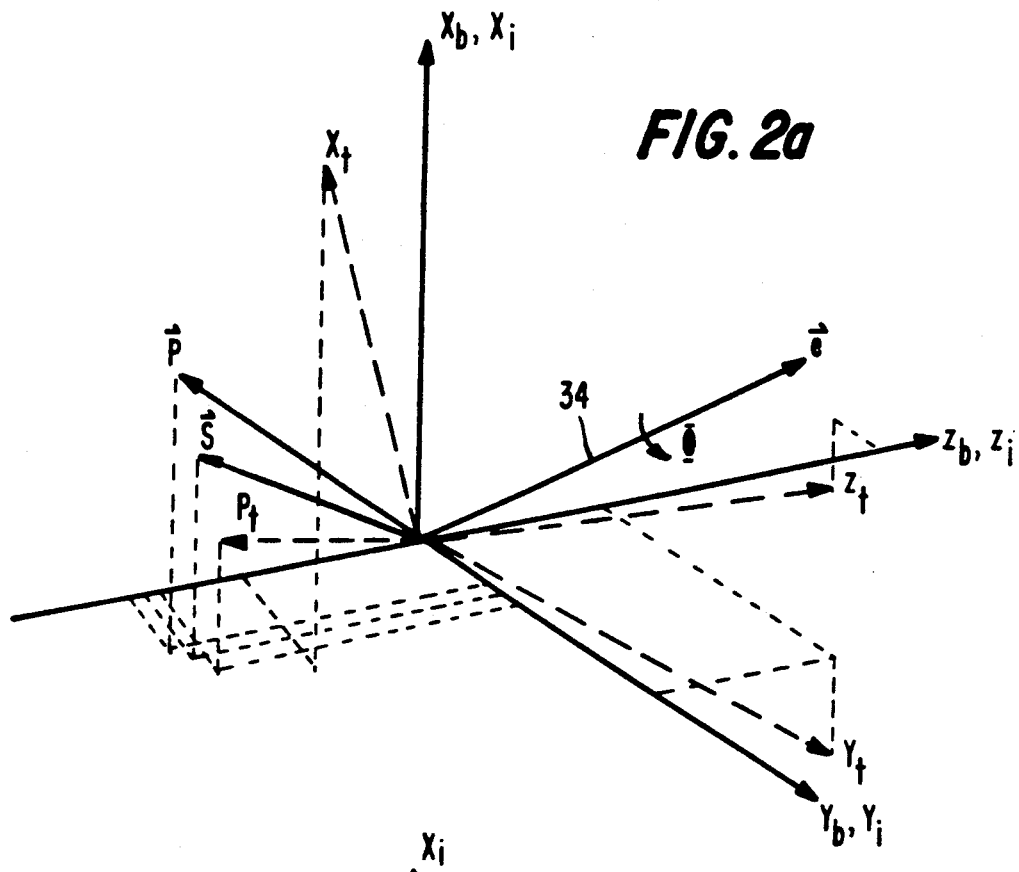
FIG. 2a illustrates coordinate systems associated with the spacecraft and with inertial space which relate to FIG. 1.

In FIG. 1, a spacecraft designated generally as 10 is located in space at a distance from the Sun illustrated as 12, and is oriented in an arbitrary attitude relative to the Sun. A spacecraft body 16 is associated with and fixed to body coordinate axes $x_b$, $y_b$, and $z_b$. The body coordinate axes of spacecraft 10 are oriented arbitrarily relative to target coordinates $x_t$, $y_t$, $z_t$, which are associated with the orientation of a target vehicle 32 relative to spacecraft 10. Body 16 of satellite 10 includes mutually orthogonal magnetic torquing coils 18, 20 and 22, which are wound for torquing the spacecraft relative to ambient magnet fields (not illustrated).

An instrument illustrated as 24 is fixedly supported on body 16 by a mounting 25 with its line of sight directed along a line 26 arbitrarily oriented and skewed relative to the $x_b$, $y_b$, and $z_b$ body coordinate axes. A line 28 defines a line of sight from target 32 to spacecraft 10. It is desired to reorient spacecraft 10 to direct the line of sight 26 of instrument 24 toward target 32. Line of sight 26 must be made to coincide with line 28, which requires that spacecraft 10 body coordinate axes $x_b$, $y_b$ and $z_b$ be made to coincide with the target coordinate frame of axes $x_t$, $y_t$ and $z_t$. When body 16 is in the target orientation, line of sight 26 will be coincident with line of sight 28, and instrument 24 will be pointed toward target 32. The shortest angular rotation necessary to reorient spacecraft 10 results from torquing body 16 so as to rotate about a single axis such as 34, which is fixed to body 16. In general, this requires torquing body 16 so as to move instrument line of sight 26 angularly through the plane in which both instrument line of sight 26 and target line of sight 28 lie.

As illustrated in FIG. 1, line of sight 30 extending between Sun 12 and spacecraft 10 also lies on or near the plane in which lines-of-sight 26 and 28 lie. If body 16 of spacecraft 10 is rotated about axis 34 to align the body coordinate frame to the target coordinate frame, line of sight 26 will move along the path illustrated as 36. During this reorientation, instrument line of sight 26 will closely coincide or substantially coincide with Sun line of sight 30. Some instruments, such as telescopes, may have their detectors damaged by such an orientation. Consequently, it is not desirable to perform the maneuver as described above. A reasonable prior art alternative might be to delay the desired maneuver until such time as target 32 or Sun 12 have moved relative to the spacecraft in such a manner that the maneuver can be made without harming the instrument.

FIG. 2a illustrates coordinate axes and vectors related to spacecraft attitude control. In FIG. 2a, the coordinate axes fixed in the spacecraft body are designated as $x_b$, $y_b$ and $z_b$. Coordinate axes $x_i$, $y_i$ and $z_i$, are inertial coordinates which remain fixed with respect to the environment surrounding the spacecraft. As illustrated in FIG. 2a, inertial coordinate axes $x_i$, $y_i$ and $z_i$ initially coincide with the spacecraft body $x_b$, $y_b$ and $z_b$ axes. A vector 34 designated ē represents the axis in the body coordinate system about which torquing occurs to rotate the spacecraft by an angle Φ in order to align the body axes $x_b$, $y_b$ and $z_b$ with the target coordinate axes as $x_t$, $y_t$, and $z_t$. FIG. 2a also illustrates a vector designated $\bar{p}$ fixed in the spacecraft body coordinate system $x_b$, $y_b$, $z_b$. A vector illustrated as $\bar{S}$ represents a vector fixed in the inertial coordinates $x_i$, $y_i$ and $z_i$, and which lies generally between vectors $\bar{p}$ and $p_t$. During the reorientation of the spacecraft, spacecraft avoidance vector $\bar{p}$ must move to target vector $p_t$ without passing through or near the inertial avoidance vector $\bar{S}$, toward which vector $\bar{p}$ may not be directed.

FIG. 3 illustrates a prior art control system with which spacecraft body 16 is associated. The control system includes 3-axis gyroscopes (gyros) illustrated as a block 52. The gyros represented by block 52 produce signals representative of the spacecraft angular rates, which are coupled over a data path 54 to a slew attitude control logic circuit illustrated as a block 55. Block 55 uses the gyro signals to propagate the transformation from the inertial to the body coordinate frame, and also calculates a control error signal which is proportional to the angular separation between the body and target coordinate frames. The control error signal is applied to a control logic circuit 56, which includes additional logic which compensates the control error signal so that the attitude control system as a whole is stable. Control logic circuit 56 produces control signals for controlling torquers 18, 20 and 22 (FIG. 1), illustrated together in FIG. 3 as a block 58. The torquing is a manner which is roughly proportional to the angular difference between vectors $\bar{p}$ and $p_t$. It will be readily understood that such a control scheme simply directs the $\bar{p}$ vector toward the $p_t$ vector, and the undesired attitude cannot be avoided when $\bar{p}$ is close to $\bar{S}$.

Figure 2B:
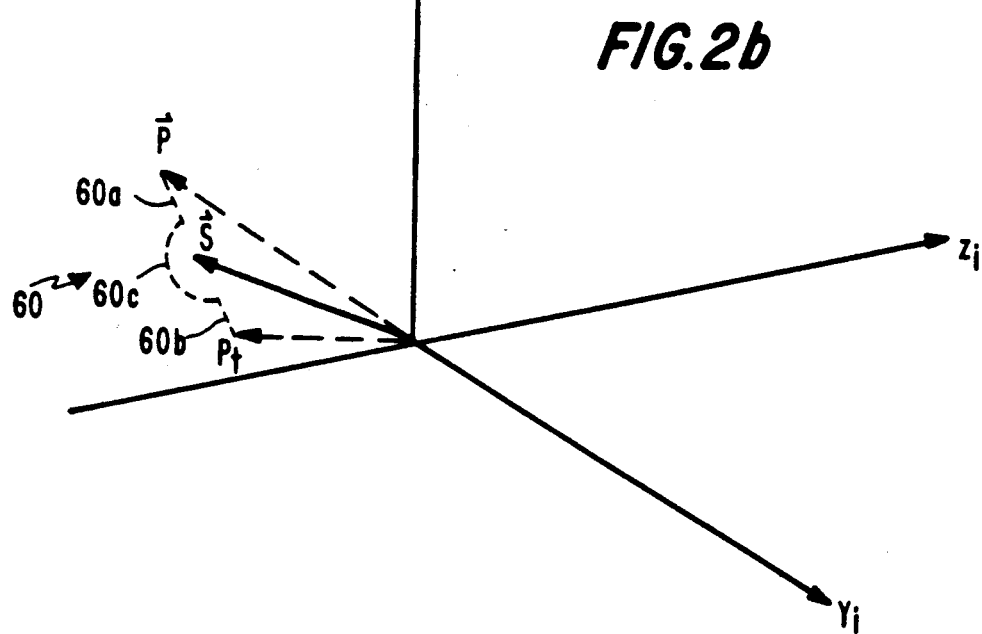
FIG. 2b is a similar coordinate system illustrating the paths taken by certain vectors during slewing in accordance with the invention.

FIG. 2b illustrates the inertial coordinates of FIG. 2a, together with the $\bar{p}$, $p_t$ and the $\bar{S}$ vectors. A dotted line 60 illustrates the path taken by the vector $\bar{p}$ in moving toward vector $p_t$ during a spacecraft reorientation maneuver according to the invention. As illustrated, path 60 includes straight-line portions 60a and 60b, and a circular or curved portion 60c which avoids vector $\bar{S}$ by a predetermined angle.

FIG. 4 is a simplified block diagram of a control system in accordance with the invention which achieves the control illustrated in FIG. 2b. Elements of FIG. 4 corresponding to those FIG. 3 are designated by the same reference numerals. In FIG. 4, the spacecraft rates sensed by gyro(s) 52 are applied over a data path 54 to slew control error generator block 55. The control error signal output of block 55 is applied to a first input port 76 of a combiner and avoidance logic arrangement illustrated as a block 78. A Sun sensor illustrated as a block 80 is mounted on spacecraft body 16 and moves therewith, and produces on a data path illustrated as 82 information about the relative orientation of the Sun in the spacecraft body frame. This Sun data is applied to a second input port 84 of combiner and avoidance logic block 78.

In general, combiner and avoidance logic circuit block 78 combines the slew error from block 55 with information about the relative location of the Sun from sensor 80 to produce control error signals on a data path 86. The control error signal at the output of block 78 may be chiefly or exclusively the control error signal from slew control error generator block 55 when the spacecraft body avoidance vector is far from the inertial avoidance vector, and may be a combination of the control error signal from block 55 with a significant amount of an avoidance error signal when the spacecraft body avoidance vector is near the inertial avoidance vector. The control error signals at the output of avoidance control logic block 78 are compensated by control logic 56 and applied to the torquers illustrated by block 58. The torquers torque the spacecraft to cause vector $\bar{p}$ to follow path 60 of FIG. 2b during the reorientation maneuver, thereby avoiding the sun-representative arrow $\bar{S}$.

Figure 5:
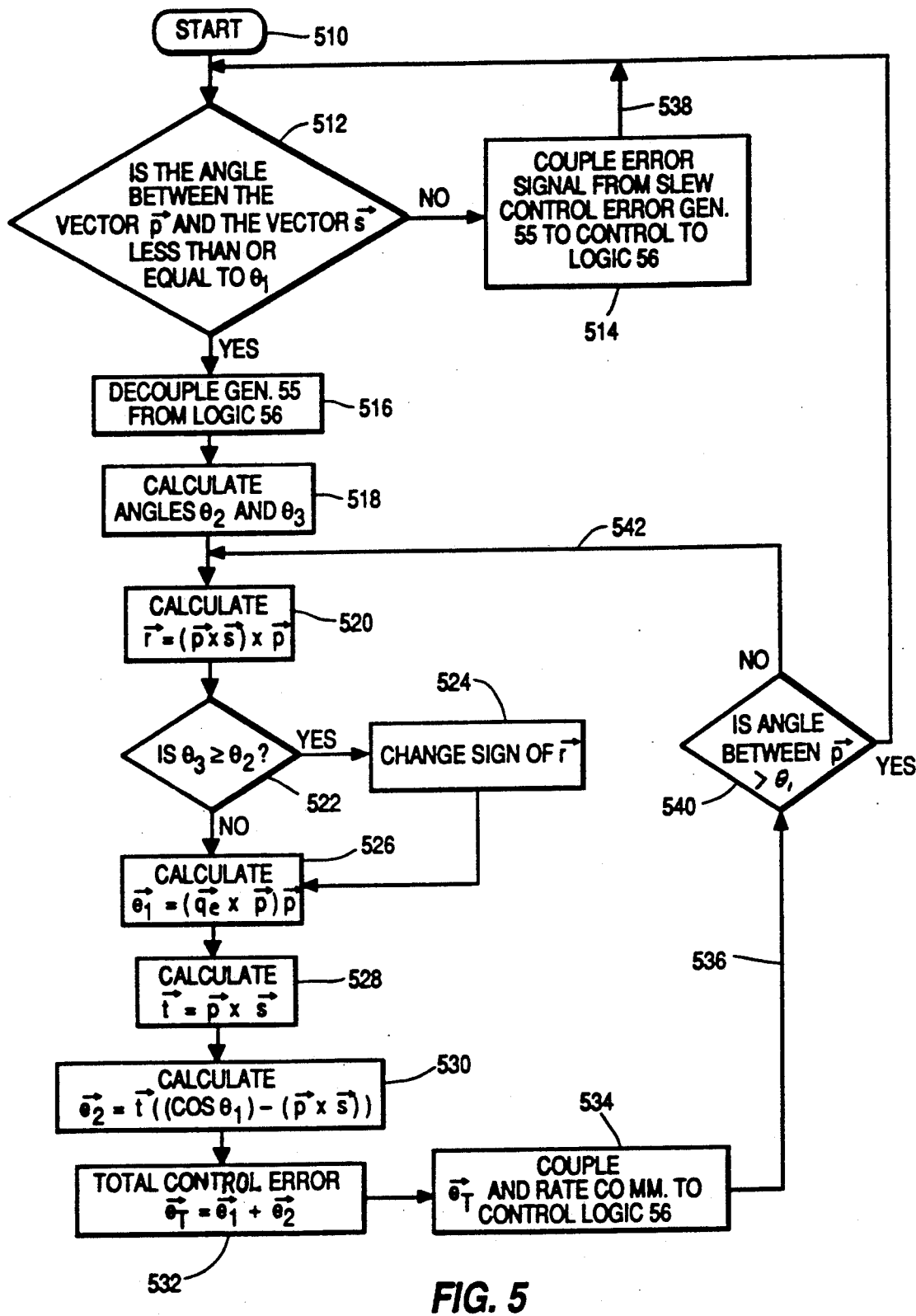
FIGS. 5 is a flow chart illustrating a control method associated with the paths of FIG. 2b.

FIG. 5 is a simplified flow chart representing the steps performed by block 78 of FIG. 4 to generate the control error signals on data path 86. In FIG. 5, the logic flows from a START block 510 to a block 512, which represents calculation of the angle between the spacecraft body avoidance vector $\bar{p}$ (instrument line-of-sight 26 of FIG. 1) and the avoidance vector in the spacecraft body coordinate frame $\bar{S}$ (line of sight 30 between spacecraft 10 and Sun 12), and comparison of that angle with a predetermined threshold angle $\theta_1$. If the angle between $\bar{p}$ and $\bar{S}$ is greater than $\theta_1$, the logic flows by the NO output of block 512 to a block 514, which represents the coupling of the error signal $q_e$ generated by slew control error generator 55 of FIG. 4 without modification to control logic block 56. In effect, this implements the prior art control scheme described in conjunction with FIG. 3. The logic then flows from block 514 back to block 512 by way of a logic path 538.

During a particular attitude control maneuver, the avoidance vectors may not approach each other, whereupon the logic continues to loop around blocks 512 and 514.

During at least some maneuvers, the avoidance vectors will eventually approach each other so that the angle between spacecraft avoidance vector $\bar{p}$ and avoidance vector $\bar{S}$ is less than or equal to $\theta_1$, in which case the logic of FIG. 4 exits from block 512 by the YES path and flows to a block 516, which represents the decoupling of slew control error generator 55 of FIG. 4 from control logic block 56. The logic flows to a block 518, which represents the calculation of $\theta_2$, the angle between the vector $\bar{e}$ and $\bar{p}$, where $\bar{e}$ is the nominal slew axis in the spacecraft body coordinate frame, and $\theta_3$, the angle between vectors $\bar{e}$ and $\bar{S}$. The quantities $\theta_2$ and $\theta_3$ are calculated only once each time the avoidance control logic is invoked. Block 520 represents the calculation of the unsigned vector $\bar{r}=(\bar{p}\times\bar{S})\times\bar{p}$, where x represents a vector cross product. Vector r represents the torquing axis needed to cause the avoidance (instrument) vector $\bar{p}$ to take a circular path around the avoidance (Sun) vector $\bar{S}$. This vector is perpendicular to both $\bar{p}$ and a tangent to the avoidance region boundary. The semicircular path is illustrated as 60c in FIG. 2b.

Referring to FIG. 2b, semicircular path 60c passes "below" avoidance vector $\bar{S}$. Clearly, the same avoidance could have been achieved by a complementary circular path (not illustrated) which passed the $\bar{p}$ vector "above" avoidance vector $\bar{S}$. The direction or sign of the spacecraft rate is selected to minimize the path length. In the flow chart of FIG. 5, the logic flows from block 520 to a decision block 522, in which angle $\theta_3$ is compared with angle $\theta_2$. If angle $\theta_3$ is greater than or equal to angle $\theta_2$, the logic flows to a block 524, which represents the changing of the sign of vector $\bar{r}$ from positive to negative. The logic then flows from block 524 to a block 526. If $\theta_3$ is less than $\theta_2$, the logic flows from decision block 522 directly to block 526 without changing the sign of $\bar{r}$.

Block 526 represents the calculation of vector $\bar{e}_1 = -(\bar{q}_e \cdot \bar{p})\bar{p}$, where "·" represents a vector dot product, and $q_e$ is the slew control error vector produced by slew control error generator 55 of FIG. 4. The logic flows from block 526 to a block 528. Block 528 represents the calculation of vector cross-product $\bar{t} = \bar{p} \times \bar{S}$. The cross product $\bar{p} \times \bar{S}$ was calculated in block 520, but is illustrated again as a separate calculation for the sake of clarity. Once the vector $\bar{t}$ is calculated, the logic flows to a block 530, which represents calculation of the avoidance error component $\bar{e}_2$:

$$\bar{e}_2 = \bar{t}((\cos\theta_1) - (\bar{p} \cdot \bar{S}))$$

The error components $\bar{e}_1$ and $\bar{e}_2$ are added in a block 532 to produce a composite or total error signal $\bar{e}_T$. Block 534 represents the application of $\bar{e}_T$ and a spacecraft rate command about the vector $\bar{r}$ to control logic 56 of FIG. 4 for compensation.

The logic then flows to a decision block 540, in which an avoidance control end condition is evaluated to determine whether $\bar{p}$ has reached the end of the avoidance segment, corresponding to path portion 60c of FIG. 2b. This is simply accomplished by determining whether or not the angle $\theta$ between vector $\bar{p}$ and vector $\bar{S}$ is greater than the threshold. If not, the logic exits from decision block 540 by the NO path, and returns to block 520 by way of a logic path illustrated as 542. If the angle between $\bar{p}$ and $\bar{S}$ is then greater than the threshold, the avoidance maneuver is at an end, and the logic flows by the YES output of decision block 540 and logic path 536 back to block 512, to again begin the control. Since the angle between $\bar{p}$ and $\bar{S}$ is greater than the threshold, block 512 will direct the logic into a loop including block 514 for normal control of the spacecraft attitude.

Other embodiments of the invention will be apparent to those skilled in the art. For example, instead of torquing coils 18, 20 and 22, spacecraft 10 of FIG. 1 may use thrusters or reaction wheels to produce torques, or it may use combinations thereof. While a threshold has been described, on one side of which torquing is performed in response to only one error signal and on the other side of which torquing is performed in response to a combination of error signals, the torquing could as easily be always in response to both error signals, with the avoidance error signal being multiplied by a factor which is proportional to the proximity of the instrument-line-of-sight to the orientation to be desired.

What is claimed is:

1. A spacecraft, comprising:
   controllable torquing means adapted for torquing said spacecraft in space under control of a torque command signal;
   sensing means adapted for determining the orientation of first, second and third spacecraft coordinate axes relative to first, second and third spatial coordinate axes associated with the environment of said spacecraft;
   first error signal generating means for generating a first error signal representative of the angular error between said spacecraft coordinates and target coordinates associated with said spatial coordinates;
   second error signal generating means for generating a second error signal related to the angle between a first avoidance vector in said spacecraft coordinates and a second avoidance vector; and
   combining means coupled to said first and second error signal generating means for generating said torque command signal in response to said first and second error signals, said combining means combining said first and second error signals in different proportions in response to said angle between said first and second avoidance vectors.

2. A spacecraft according to claim 1, wherein said combining means comprises:
   threshold means coupled to said second error signal generating means for generating a threshold signal when said second error signal reaches a threshold representative of a predetermined angle between said first and second avoidance vectors;
   said combining means including a first port coupled to said first error signal generating means and also including a second input port, for combining a signal applied to said second input port with said first error signal for generating said torque command signal; and
   gating means coupled to said second error signal generating means, to said threshold means, and to said combining means, for gating said second error signal to said second input port of said combining means in a predetermined condition of said threshold signal.

3. A method for controlling the attitude of a spacecraft from a first orientation to a second orientation relative to an environment by a path which avoids an undesired orientation, comprising the steps of:
   establishing the current orientation of first, second and third spacecraft coordinate axes relative to first, second and third spatial coordinate axes associated with the environment of said spacecraft;
   generating a first error signal representative of at least the angular difference between the orientation of said spacecraft coordinates and target coordinates associated with said spatial coordinates;
   generating an avoidance error signal representing at least the difference between the orientation of a first vector associated with said spacecraft coordinates and a second vector;
   combining said first error signal with said avoidance error signal to produce a combined error signal which is principally comprised of said first error signal when said difference between the orientation of said first vector and said second vector is large, and in which the proportion of said avoidance error signal to said first error signal increases when said difference between the orientation of said first vector and said second vector is smaller; and
   torquing said spacecraft in response to said combined error signal.

4. A method according to claim 3 wherein said combining step includes the steps of:
   comparing said avoidance error signal with a threshold value representing the closest desired approach of said first vector to said second vector, and generating a threshold signal at least in response to the identity of said avoidance error signal with said threshold value;
   torquing said spacecraft in response to said first error signal when said threshold signal is in a first state to slew said spacecraft coordinate axes toward said target coordinate axes; and
   torquing said spacecraft in response to a combination of said first and avoidance error signals when said threshold signal is in a state other than said first state, to thereby cause said spacecraft coordinate axes to slew toward said target coordinate axes while avoiding having said first vector approach said second vector.

5. A method according to claim 4 wherein said step of comparing said avoidance error signal with a threshold value comprises the step of generating said first state of said threshold signal when said avoidance error signal is identical with said threshold value and when said avoidance error signal is one of greater than and less than said threshold value.

* * * * *